Patented May 28, 1940

2,202,234

UNITED STATES PATENT OFFICE 2,202,234

PROCESS OF IMPROVING THE STABILITY OF LUMINOUS PAINTS

Konrad Schad, Frankfort-on-the-Main-Hochst, and Robert Ketzer, Hofheim in Taunus, Germany, assignors to I. G. Farbenindustrie Aktiengesellschaft, Frankfort-on-the-Main, Germany No Drawing. Application July 6, 1938, Serial No. 217,823. In Germany July 22, 1937

2 Claims. (Cl. 250—81)

The present invention relates to a process of improving the stability of luminescent alkaline earth metal sulfides and of luminous paints containing such sulfides.

As is known, luminous alkaline earth metal sulfides are very sensitive substances. Even when stored under atmospheric conditions the pulverulent luminous pigment is attacked, the sulfide assuming a yellow to brown coloration with evolution of hydrogen sulfide and loss of its luminescent power. Not only the moisture and carbon dioxide contained in the atmosphere, but also light, especially of short wave length, has an effect on the pigment. Especially sensitive are the luminous substances containing strontium sulfide as the main constituent which are the most important for practical purposes on account of their relatively strong luminescent power. The said pulverulent luminous pigments containing alkaline earth metal sulfides, therefore, must be stored in airtight containers protected against ultra-violet rays.

In most of the cases luminous substances are industrially applied in the form of paint. Hitherto, however, it has not been possible to find a binding agent for the sensitive alkaline earth metal sulfides which protect the luminous pigment for a prolonged time against the common action of the moisture and the carbon dioxide content of the atmosphere and against the light rays of short wave length.

Now we have found that by the addition of anhydrous, finely pulverized, pure sodium carbonate to pulverulent luminous pigments containing alkaline earth metal sulfides as the main constituents prepared in the usual manner or to paints containing such pigments the destruction of the luminescent power by the action of air and light may be strongly retarded. In this case an addition of about 20 per cent. of sodium carbonate is sufficient so that on account of the small quantity added the power of the luminescence is scarcely decreased by the addition of non-luminescent matter. Whereas sensitive luminous pigments containing alkaline earth metal sulfides, especially luminous substances containing strontium sulfide, by the action of air saturated with water vapor, soon evolve hydrogen sulfide while becoming brown and lose their luminescent power, the same luminous pigments containing about 20 per cent. of anhydrous sodium carbonate remain practically unchanged for several days when exposed to the action of air saturated with water vapor.

At the time being it is not yet possible to explain the action of the addition of sodium carbonate. The supposition that, by the action of the moisture of the atmosphere, the anhydrous sodium carbonate is transformed into the form containing crystal water and that in this manner the moisture is removed before it can act upon the alkaline earth metal sulfide has only a remote probability, for numerous other substances which likewise change from the anhydrous form into the form containing water of crystallization have no improving action upon the stability of alkaline earth metal sulfides.

The mixtures of a pulverulent luminous pigment with the addition of anhydrous sodium carbonate may be used with suitable binding agents for the preparation of the finished paints. There are used, of course, preferably binding agents the stability of which is not detrimentally affected by the sodium carbonate.

The following example serves to illustrate the invention, but is not intended to limit it thereto:

100 grams of a luminous pigment containing strontium sulfide are well mixed with 20 grams of anhydrous pulverulent sodium carbonate and the mixture is applied upon a suitable carrier, polystyrene lacquer being used as binding agent. If such a painting is exposed in the open air to the action of the atmosphere and light, the discoloration of the painting and in consequence thereof the decrease of the luminescent power is considerably less than in the case of a comparison painting prepared in the same manner by means of the same luminous pigment but without the addition of sodium carbonate.

We claim:

1. A process for improving the stability of luminescent alkaline earth metal sulfides and of paints and paintings containing such sulfides which comprises adding anhydrous, pulverized sodium carbonate to the pulverulent luminescent sulfides after firing.

2. A process for improving the stability of luminescent alkaline earth metal sulfides and of paints and paintings containing such sulfides which comprises adding 20 per cent of anhydrous, pulverized sodium carbonate to the pulverulent luminescent sulfides after firing.

KONRAD SCHAD.
ROBERT KETZER.